Oct. 31, 1961     W. C. HOOKWAY     3,006,597
VALVE
Filed Jan. 7, 1957
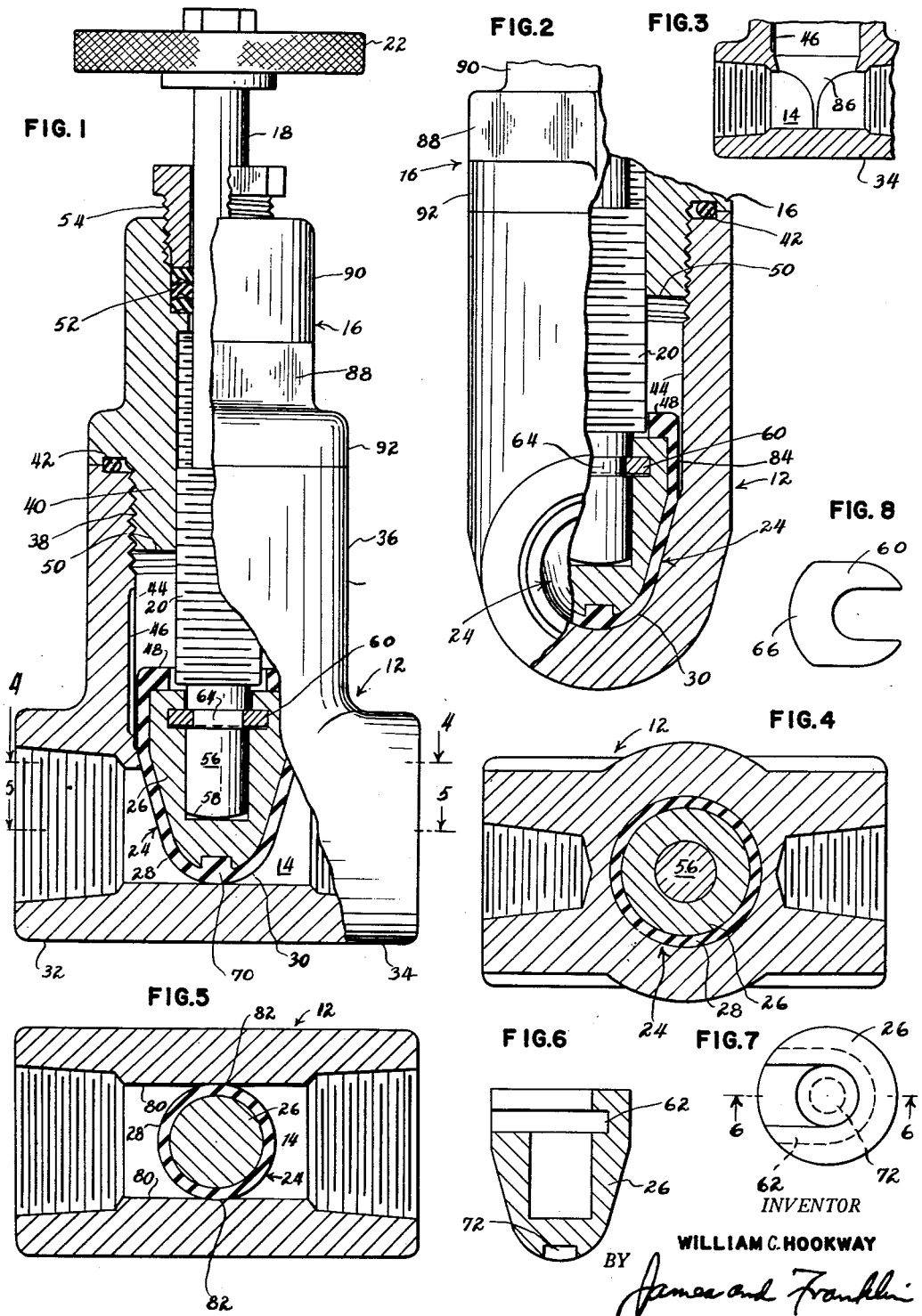
INVENTOR
WILLIAM C. HOOKWAY
BY James and Franklin
ATTORNEYS

United States Patent Office 3,006,597
Patented Oct. 31, 1961

3,006,597
VALVE
William C. Hookway, Morristown, N.J., assignor to Cooper Alloy Corporation, Hillside, N.J., a corporation of New Jersey
Filed Jan. 7, 1957, Ser. No. 632,940
1 Claim. (Cl. 251—88)

This invention relates to valves, and more particularly to a plug type gate valve.

A primary object of the present invention is to generally improve valves. A more particular object is to provide a valve which has the positive closure of a gate valve, with the durable throttling characteristic of a globe valve.

Another object of the invention is to retain the usual advantages of a gate valve, such as its straight through flow with minimum pressure drop, and its ability to handle viscous materials, while obtaining additional advantages such as positive closure even with gritty materials or abrasive slurries, and the absence of cavities or pockets which trap sludge or precipitates. Instead the valve is self-draining. It is also simple to service and to maintain.

A further object is to provide a valve which is adapted to handle highly corrosive materials. The parts of the valve are so simple in design that the entire valve structure may be made of plastics materials. Thus liquids which attack metals, or which are undesirably contaminated by metals, may be handled by the valve here disclosed when made of a suitably chosen plastics material. However, in other cases, the requirements may be met while using an appropriate metal alloy such as stainless steel for the valve structure.

The present valve employs a plug made up of a rigid core and a soft cover, and in accordance with further features and objects of the invention, the cover may be replaced when worn without removal of the valve from the pipeline, and without the use of special tools. A part of the cover may be used to relieve pressure on the packing of the valve stem when the valve is open.

To accomplish the foregoing general objects, and more specific objects which will hereinafter appear, my invention resides in the valve elements, and their relation one to another, as are hereinafter more particularly described in the following specification. The specification is accompanied by a drawing in which:

FIG. 1 is a partially sectioned elevation of a valve embodying features of my invention;

FIG. 2 is a partially sectioned vertical elevation taken in a plane transverse to FIG. 1;

FIG. 3 is a fragmentary section similar to FIG. 1 but with the valve stem and plug removed;

FIG. 4 is a horizontal section taken approximately in the plane of the line 4—4 of FIG. 1;

FIG. 5 is a horizontal section taken approximately in the plane of the line 5—5 of FIG. 1;

FIG. 6 is a section through the core of the plug, taken approximately in the plane of line 6—6 of FIG. 7;

FIG. 7 is a plan view of the core; and

FIG. 8 shows an insert or key which holds the plug on the valve stem.

Referring to the drawing, the valve body is designated 12, and has a flow passage 14 the lower part of which acts also as a valve seat. In the present case the body has an inverted T-shape, and is closed at the top by a bonnet 16 carrying a valve stem 18. With the valve body in the normal position shown, the valve stem is vertical, and is vertically movable in the bonnet. The movement preferably is produced by an operating thread 20 on the stem, received in a mating thread in the bonnet, in which case the stem is operated by rotation, and for this purpose may be provided with a suitable wheel or handle 22.

The valve may be called a "plug type gate valve," for the stem carries at its lower end a gate in the form of a plug generally designated 24. The horizontal sections through the plug are circular, as will be seen in FIGS. 4 and 5. The lower end 30 of the plug preferably conforms to the surface of a sphere having the same diameter as the passage 14 through the valve body, the said passage ordinarily and most conveniently being a cylindrical passage.

The main plug and body parts 26 and 12 include a sealer member 28 fitting therebetween at the sides and bottom of the plug, as is best shown in FIGS. 2 and 5, in order to seal the passage 14 against flow when the plug is moved down. The main plug and body parts are made of a rigid material, and the sealer member 28 is made of a soft material. As illustrated on the first sheet of drawing, the sealer member 28 is a cover fitted around and movable with the main plug part or core 26. In effect, the core 26 and cover 28 together make up the complete plug 24.

In the case here shown, the valve body 12 has ends 32 and 34 which are internally threaded with a pipe thread, to receive pipes leading to and from the valve. The upstanding portion 36 is internally threaded at 38 to receive the matingly threaded lower end 40 of the bonnet 16. The connection may be sealed, as by means of an O-ring type gasket 42. It will be observed that the diameter of the thread 38 is greater than that of the plug 24, so that by unscrewing the bonnet, the assembly of the valve stem and plug may be readily removed from the valve body, for examination and possible replacement of the plug cover 28. This is done without special tools, and without requiring removal of the valve body from the pipeline.

When the valve body is of T-shape as here shown, the flow passage 14 is a straight-through passage which is readily finished to cylindrical shape, and which acts also as a valve seat. The conical upper part of the valve seat is readily formed through the upright cylindrical passage 44.

It will be noted that the diameter of the passage 44 is close to that of the plug, and a relief passage 46 is preferably provided for relief of pressure above the plug when the valve is being opened.

The plug cover 28 extends inward over the core 26, as shown at 48. This serves not only to hold the cover on the plug, but also an additional purpose when the valve is fully opened, for the top 48 of the plug then bears against the bottom surface 50 of the bonnet. The resulting seal reduces or even eliminates pressure against the packing 52 around the valve stem 18. This packing may be of conventional type, and may be tightened in the usual way by means of a threaded gland 54. When the valve is fully closed or fully opened, there is little or no pressure against the packing, and the latter is subjected to the main pressure of the line only during the operation of opening or closing the valve.

The plug 24 may be anchored on the lower end of the stem 18 in any desired fashion, although it is desirable for obvious reasons that the plug be freely rotatable relative to the stem. In the present case the core 26 has an axial hole which receives the cylindrical lower end 56 of the stem. The bottom end of part 56 is preferably rounded somewhat as shown at 58, thereby reducing friction when the valve is closed tightly. The plug is drawn upward with the stem by means of an insert or key 60. This is a generally U-shaped or bifurcated member, the outline of which is best shown in FIG. 8 of the drawing.

By reference to FIGS. 6 and 7, it will be seen how the core 26 is horizontally slotted at 62 to receive the locking insert 60. FIGS. 1 and 2 show how the lower end 56 of the valve stem is peripherally grooved or channelled at 64 to a reduced diameter, which receives the insert 60. It will be understood that to assemble the parts, it is merely necessary to insert the lower end of the valve stem into the plug, to then slide the insert 60 horizontally into the mating grooves 62 and 64, at which time the outer end 66 (FIG. 8) of the insert is flush with the peripheral exterior of the core 26. The preshaped cover 28 is then drawn over the core, and the cover itself serves to hold the insert 60 against outward movement.

Referring now to FIG. 1 of the drawing, the bottom of the plug cover 28 preferably has an upwardly projecting stud 70. The lower end of the core 26 has an inverted hole or pocket, shown also at 72 in FIG. 6, to receive the stud 70. This anchors the lower end of the cover against lateral movement relative to the core, thus enabling the valve to withstand a high pressure which might otherwise tend to displace the lower end of the cover relative to the bottom of the passage 14, with consequent possibility of leakage.

The plug is generally conical in configuration. The upper end 84 (FIG. 2) is cylindrical, with a diameter substantially greater than that of the horizontal passage 14 through the valve body. The bottom of the plug preferably conforms to the surface of a sphere having the same diameter as the passage 14, and thus no special valve seat is needed at the bottom. At the sides of the passage, a frusto-conical surface is provided to mate with the plug 24. This is readily molded or/and machined through the upright part 36 of the valve body, on the axis of the valve stem. The conical surface begins at its circle of tangency with the spherical surface, and thus begins somewhat lower than a horizontal plane passing through the axis of the horizontal passage 14. A section taken just above the passage 14, as in the plane of the line 4—4 of FIG. 1, appears as shown in FIG. 4. This shows the sealing action of the plug above the passage. A horizontal section taken approximately in the plane of line 5—5 is shown in FIG. 5. This is the plane of tangency. At any higher plane the sides 80 of the passage are expanded slightly at 82. This is to receive the conical surface, and sections taken still higher will show a greater expansion into the side walls 80 of the passage 14.

There is accordingly no possibility of lateral movement of the conical soft material of the cover because it is anchored at the sides. The top is anchored as shown in FIG. 4. The bottom is anchored by reason of stud 70.

The resulting sealing surface or valve seat has a shape somewhat as shown at 86 in FIG. 3 of the drawing. Theoretically, this surface narrows to a line at the bottom, but it will be understood that in practice the closing of the valve exerts pressure which at least slightly flattens the cover of the plug against the inside of the valve body, and it is to indicate this result that the lower end of the surface 82 has been given a slight width.

It will be understood that the bonnet 16 has flats 88 to receive a wrench. In the present case the flats make a square nut which circumscribes the small diameter upper part 90 of the bonnet, as shown in FIG. 1, and which is inscribed in the large diameter lower part 92 of the bonnet, as shown in FIG. 2. In FIG. 2 the bonnet has been turned 45° instead of 90°, relative to FIG. 1, in order to show this relation.

The parts of the present valve are of such simple design that they be molded out of the usual known plastics materials. It is thus possible to select a hard plastics material which will withstand the particular fluid which is to be handled by the valve. The soft cover similarly may be made of a suitable soft material, preferably a soft plastics material. The fluoro-carbon elastomers such as Hypalon and Kel-F are valuable for this purpose, and in thin sections, Teflon is also usable.

It is not necessary that the hard structural parts be made of a plastics material, and in many cases it is feasible and desirable to use a special metal alloy such as chromium nickel stainless steel. Of course, even in such case, the cover of the plug is preferably made of a relatively soft material, selected to withstand the fluid being handled. The stud 70 is optional, and in most cases is not needed.

In the present case, the valve body is shown with threaded ends to receive threaded piping, but it will be understood that the valve body, if desired, may be provided with flanged ends for flanged piping. Also, with a threaded valve body, as shown, the exterior at the ends may if desired, be provided with flats to receive a wrench.

It is believed that the construction, and the method of assembly and servicing of my improved valve, as well as the advantages thereof, will be apparent from the foregoing detailed description. The valve provides a positive on or off closure, comparable to that of a standard gate valve, but it has a long-lasting throttling characteristic more nearly resembling that of a globe valve. The simplicity of construction, as well as the minimum number of parts for the valve structure, make it ideally suited for an all-plastics valve construction.

There are many advantages even when using metal parts such as stainless steel. The flow through the valve is a straight-through flow, with no cavities or inaccessible pockets in the valve body, thereby avoiding the trapping of stagnant fluid, or the accumulation of precipitates or sludge. Because the sealer member is resilient, the valve may be used for the handling of gritty fluids or abrasive slurries. A positive closure of the valve is obtained even with gritty materials. The wear of the sealer member in FIG. 1 is greatly prolonged because its orientation changes randomly each time the valve is opened and closed, thus subjecting different parts of the cover to the closing pressure. The sealer member is readily removable and replaceable without the use of special tools, and without necessitating removal of the valve body from the line. The sealer member may be provided in any of a large variety of materials, which are interchangeable and usable in an otherwise standardized valve, thus readily meeting a wide variety of requirements in industry. Old and well known materials such as rubber may be used, as well as newly discovered materials such as fluoro-carbon elastomers. Pressure against the stem packing is minimized in FIG. 1 when the valve is fully open, as well as when closed. The valve body is self-draining.

It will be understood that while I have shown and described my improved valve in a preferred form, changes may be made in the structure shown without departing from the scope of the invention, as sought to be defined in the following claim. In the claim, the reference to the valve stem being vertical is merely for convenience, and is meant in a relative sense, it being understood that the valve may be mounted in any desired position without affecting the operation thereof.

I claim:

A gate valve comprising a valve body, said body having a cylindrical flow passage acting also as a valve seat, said passage being a straight-through unobstructed passage, a bonnet, a vertical valve stem received in said bonnet, and a gate rotatably carried at the lower end of the stem, said gate being in the form of an inverted frusto conical plug having a sealing surface the horizontal sections through which are circular, the plug and stem being so arranged that the orientation of the plug may be random, the sealing surface of the lower end of said plug conforming to the surface of a portion of a sphere having approximately the same diameter as the passage through the valve body at the gate, the frusto conical surface of said plug being divergently tangential to said lower spherical portion of said plug, and the said passage acting as a valve seat to receive the lower end of the plug when the valve is closed, the seat above said lower end of the plug being frusto conical to mate with the frusto conical portion of the plug, the core of said plug being made of a rigid material, and the surface of said plug being a cover made of a soft material, the top of the cover extending inward over the core and being adapted to bear against the upper end of the bonnet when the valve is fully opened, thereby reducing pressure on the packing of the valve stem, said core rotatably receiving the lower end of the valve stem and being locked against axial movement thereon by a generally U-shaped insert received in mating grooves in the core and stem, and said insert being held in position by the aforesaid cover, said plug seating randomly and sealing both ports formed by the cylindrical passage on opposite sides of the plug.

References Cited in the file of this patent

UNITED STATES PATENTS

| | | |
|---|---|---|
| 2,304 | Chapman | Oct. 11, 1841 |
| 57,329 | Jenkins | Aug. 21, 1866 |
| 1,182,359 | Dies | May 9, 1916 |
| 1,804,137 | Yates | May 5, 1931 |
| 2,194,263 | Allen | Mar. 19, 1940 |
| 2,202,735 | Johnson | May 28, 1940 |
| 2,204,452 | Seppelfricke | June 11, 1940 |
| 2,205,533 | Langdon | June 25, 1940 |
| 2,359,369 | Kunkel | Oct. 3, 1944 |
| 2,420,849 | Wilson | May 20, 1947 |
| 2,617,171 | Kimmel | Nov. 11, 1952 |
| 2,701,118 | Uhler | Feb. 1, 1955 |
| 2,705,124 | Price | Mar. 29, 1955 |
| 2,735,645 | Freed | Feb. 21, 1956 |
| 2,797,062 | Otter | June 25, 1957 |
| 2,842,400 | Booth | July 8, 1958 |
| 2,891,763 | Fortune | June 23, 1959 |

FOREIGN PATENTS

| | | |
|---|---|---|
| 27,678 | Great Britain | Dec. 2, 1912 |
| 372,482 | Great Britain | May 12, 1932 |
| 57,028 | Denmark | Nov. 27, 1939 |
| 1,100,423 | France | Sept. 20, 1955 |

OTHER REFERENCES

Pulp & Paper Magazine of Canada, December 1950. (Copy in Scien. Lib.)